(12) United States Patent
Crisosto et al.

(10) Patent No.: US 12,538,928 B1
(45) Date of Patent: Feb. 3, 2026

(54) CATALYZED SULFUR DIOXIDE RELEASE SYSTEM FOR CONTROLLED FUMIGATION OF POSTHARVEST CROPS AND RELATED METHODS

(71) Applicants: Carlos Crisosto, Pismo Beach, CA (US); Gayle Crisosto, Pismo Beach, CA (US); Curtis Granger, Truckee, CA (US)

(72) Inventors: Carlos Crisosto, Pismo Beach, CA (US); Gayle Crisosto, Pismo Beach, CA (US); Curtis Granger, Truckee, CA (US)

( * ) Notice: Subject to any disclaimer, the term of this patent is extended or adjusted under 35 U.S.C. 154(b) by 0 days.

(21) Appl. No.: 19/188,013

(22) Filed: Apr. 24, 2025

(51) Int. Cl.
*A23B 7/10* (2006.01)

(52) U.S. Cl.
CPC .................... *A23B 7/10* (2013.01)

(58) Field of Classification Search
CPC ........................................................ A23B 7/10
USPC ......................................................... 422/305
See application file for complete search history.

(56) References Cited

U.S. PATENT DOCUMENTS

| | | | |
|---|---|---|---|
| 6,841,572 B2 | 1/2005 | Horst et al. | |
| 2011/0171201 A1* | 7/2011 | Siegel | A61P 1/04 424/94.63 |
| 2013/0045314 A1 | 2/2013 | Shastri et al. | |
| 2016/0113300 A1* | 4/2016 | Santos | A23L 19/12 426/267 |

FOREIGN PATENT DOCUMENTS

| | | | |
|---|---|---|---|
| AU | B-37294/89 | * | 7/1989 |
| AU | 613775 B2 | | 8/1991 |
| WO | 2007133272 A1 | | 11/2007 |
| WO | 2019215763 A1 | | 11/2019 |

OTHER PUBLICATIONS

Martinez-Blay, Victoria et al.—Postharvest Treatments with Sulfur-Containing Food Additives to Control Major Fungal Pathogens of Stone Fruits—Foods 2021, 10, 2115; https://doi.org/10.3390/foods10092115.

Allagui, Mohamed Behir et al.—Effectiveness of Sodium Metabisulfite against Fungal Rot of Fruit after Harvest and Assessment of the Phytotoxicity Induced in Treated Fruit—Preprints.org (Mar. 19, 2024); doi: 10.20944/preprints202403.1146.v1.

(Continued)

*Primary Examiner* — Charles Capozzi
*Assistant Examiner* — Jacqueline Brazin
(74) *Attorney, Agent, or Firm* — Sierra IP Law, PC; William K. Nelson

(57) ABSTRACT

A moisture-activated sulfur dioxide ($SO_2$) release system is disclosed for postharvest preservation of fruits, vegetables, and other fresh plant products. The system comprises a composition including sodium metabisulfite (SMBS) and citric acid that, upon exposure to humidity, rapidly generates $SO_2$ gas to suppress fungal growth. Various deployment systems enable immediate or sustained release based on packaging conditions and crop type. The system provides a safer alternative to traditional $SO_2$ fumigation, and provides improved decay control and extended shelf life.

16 Claims, 5 Drawing Sheets

Accumulated sulfur dioxide emission during the first hour of the treatment after applying 0.125 grams of metabisulfite combined with 0.100 g citric acid sachet in a 20 liters table grape plastic box. Each point represents the average of three replications.

(56) References Cited

OTHER PUBLICATIONS

Allagui, Mohamed Behir et al.—Effectiveness of Several GRAS Salts against Fungal Rot of Fruit after Harvest and Assessment of the Phytotoxicity of Sodium Metabisufite in Treated Fruit—J. Fungi 2024, 10, 359; doi: 10.20944/preprints202403.1146.v1.

Sgroppo, S. C. et al.—Effects of sodium metabisulphite and citric acid on the shelf life of fresh cut sweet potatoes—Spanish Journal of Agricultural Research 2010 8(3), 686-693; Available on-line at https://sjar.revistas.csic.es/index.php/sjar/article/view/1266.

Kendall, P. et al.—Drying Fruits—Colorado State University Extension, Fact Sheet No. 9.309 (2012)—available on-line https://routt.extension.colostate.edu/wp-content/uploads/sites/4/2018/05/9.309-Drying-Fruits.pdf.

Nascimento, Revenli et al.—Use of sodium metabisulfite and ascorbic acid as anti-browning agents in processed potatoes—British Food Journal • Nov. 2019; www.emeraldinsight.com/0007-070X.htm; DOI: 10.1108/BFJ-05-2019-0322.

Fernanda do Nascimento, Revenli et al.—Use of Sodium Metabisulphite and Ascorbic Acid to Control Browning in Ready-to-Eat Processed Potatoes during Prolonged Storage—European Potato Journal • Aug. 2020; https://doi.org/10.1007/s11540-020-09461-1.

Natskoulis, Pantelis I. et al.—Evaluating the efficacy of turbimetric measurements as a rapid screening technique to assess fungal susceptibility to antimicrobial compounds as exemplified by the use of sodium metabisulfite—accessed on Jan. 6, 2025, on-line https://www.sciencedirect.com/science/article/abs/pii/S0963996918300668.

Uylaser, Vildan et al.—Effects of Citric Acid and Na-Metabisulphite on the Shelf Life of Minimally Processed Haciomer cv. Chestnut—International Journal of Applied Science and Technology vol. 4 No. 1; Jan. 2014; www.ijastnet.com.

Gabler, F. Mlikota et al.—Postharvest Control of Table Grape Gray Mold on Detached Berries with Carbonate and Bicarbonate Salts and Disinfectants—Am. J. Enol. Vitic. 52:1 (2001).

Ratnayake et al.—Effect of GRAS compounds on Aspergillus rot of wood-apple (*Feronia limonia*)—Phytoparasitica (2009) 37:431-436; DOI 10.1007/s12600-009-0056-1.

\* cited by examiner 101
100

FIG. 3

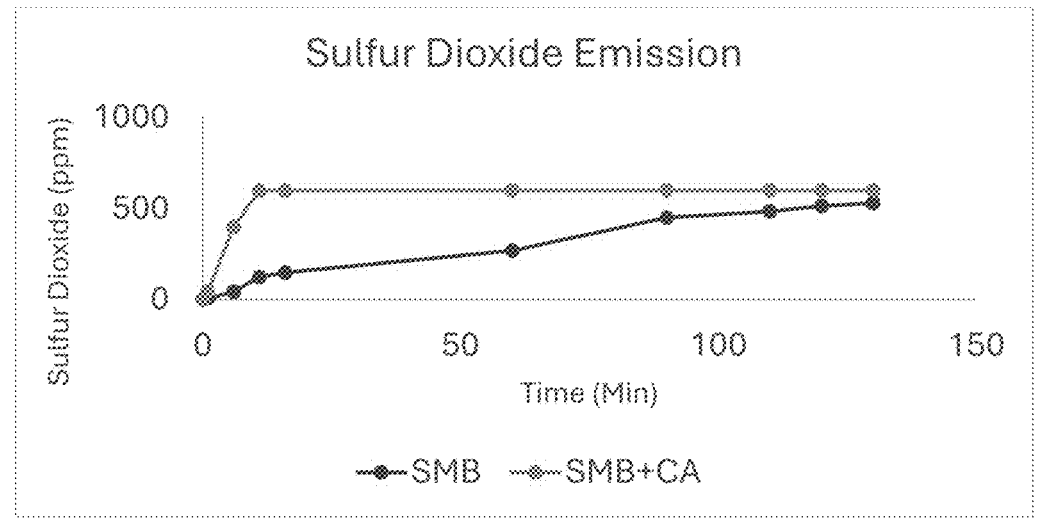

Accumulated sulfur dioxide emission during the first hour of the treatment after applying 0.500 gram of metabisulfite combined with 0.400 g citric acid in a 20 liters table grape plastic box. Each point represents the average of three replications.

FIG. 4

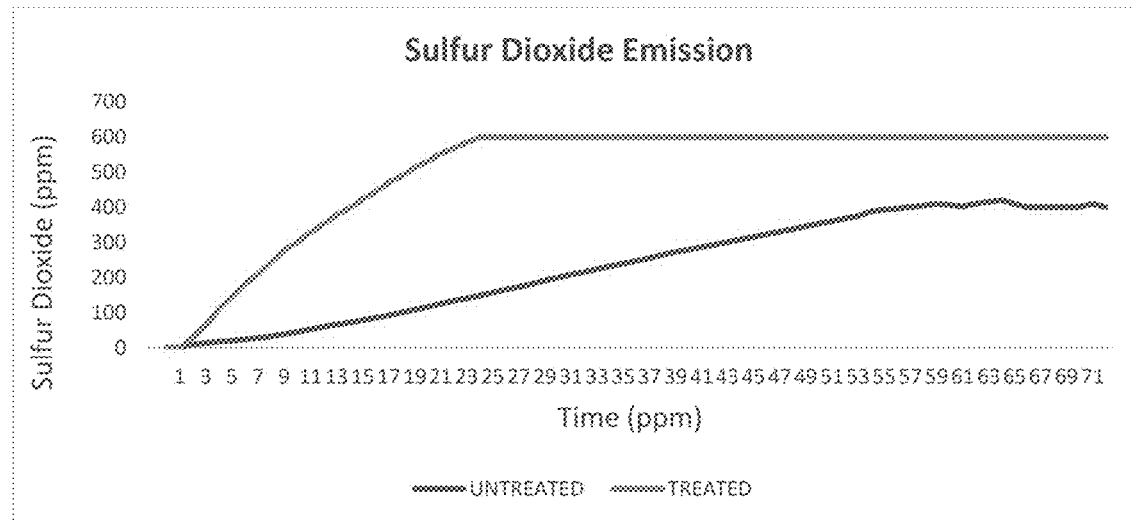

Accumulated sulfur dioxide emission during the first hour of the treatment after applying 0.250 grams of metabisulfite combined with 0.200 g citric acid sachet treatment in a 20 liters table grape plastic box. Each point represents the average of three replications.

FIG. 5

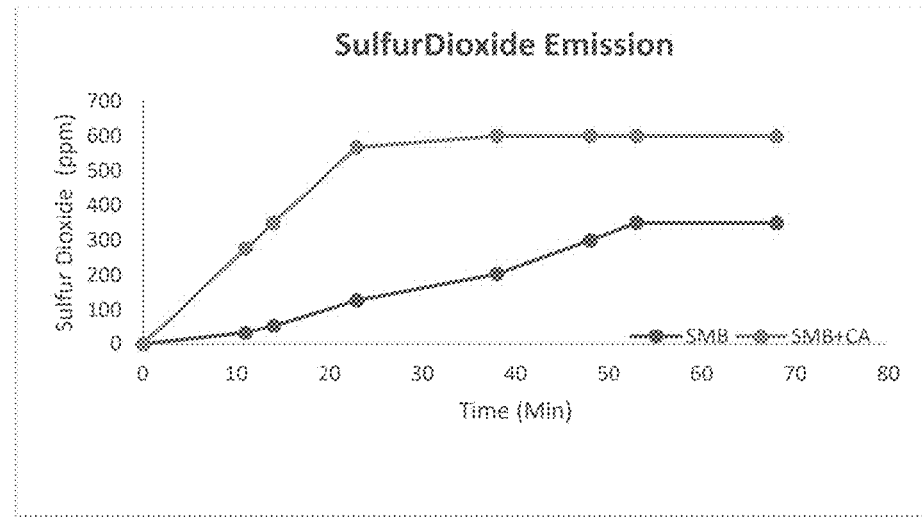

Accumulated sulfur dioxide emission during the first hour of the treatment after applying 0.125 grams of metabisulfite combined with 0.100 g citric acid sachet in a 20 liters table grape plastic box. Each point represents the average of three replications.

FIG. 6

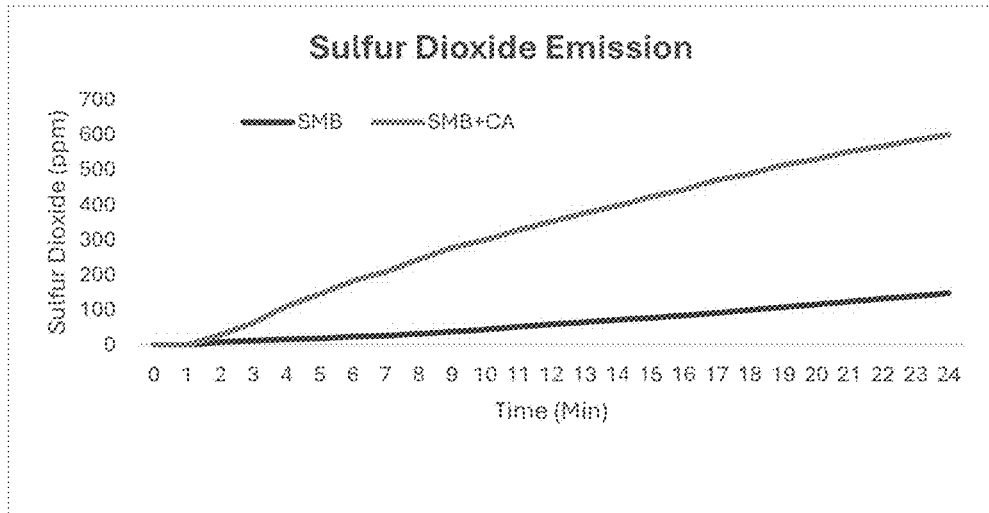

Accumulated sulfur dioxide emission during the first hour of the treatment after applying 0.063 grams of metabisulfite combined with 0.050 grams of citric acid sachet in a 20 liters table grape plastic box. Each point represents the average of three replications.

FIG. 7

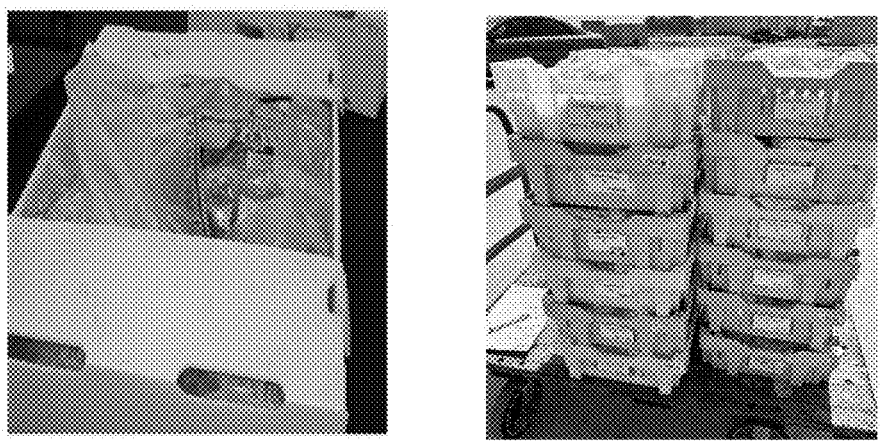

FIG. 8

| Treatment | Rachis Condition (1-4) | Gray Mold (%) | Incidence of Gray Mold relative to Untreated (%) |
|---|---|---|---|
| 0.5g MBS+0.4g CA | 2-3 | 0.9a | 12.0 |
| 1g MBS | 3-4 | 2.4b | 30.0 |
| Untreated | 3-4 | 3.3c | 100.0 |

Natural decay incidence in 'Stella Bella' table grape quality affected by Metabisulfite (MBS) treatment with and without catalyzer (citric acid, CA) treatments applied at harvest and measured after 4 weeks of cold storage (2022 season). Rachis conditions: 1=Green-healthy; 2=Slight only cap stems showing browning, 3=moderate = cap stems and secondary stems showing browning, and 4= severe = cap stems, secondary and primary stems fully brown.

FIG. 9

| Cultivars | Gray Mold (%) | | |
|---|---|---|---|
| | Untreated | 0.5g MBS+0.4g CA | Incidence of Gray Mold relative to Untreated (%) |
| 'Stella Bella' | 3.2a | 1.1b | 34 |
| 'Scarlet Royal' | 3.4a | 1.1b | 32 |
| 'Flame Seedless' | 2.0a | 1.0b | 50 |
| 'Thompson Seedless' | 3.3a | 1.3b | 39 |
| 'Sugranineteen' | 3.1a | 0.9b | 29 |
| 'Allison' | 1.5a | 0.5b | 33 |
| 'Redglobe' | 3.0a | 1.0b | 33 |

Gray mold incidence in seven table grape cultivars Metabisulfite (MBS) with and without catalyzer (citric acid, CA) treatments applied at harvest and measured after 4 weeks of cold storage (2023 season).

Means followed by the same letters within the same row are not different according to Tukey's test at 5% of probability. LSD: Least Significant Difference.

CATALYZED SULFUR DIOXIDE RELEASE SYSTEM FOR CONTROLLED FUMIGATION OF POSTHARVEST CROPS AND RELATED METHODS

FIELD OF THE INVENTION

The present invention relates to a controlled-release fumigation system specifically designed for postharvest preservation of perishable produce through sulfur dioxide ($SO_2$) emission. More particularly, the present invention provides a sodium metabisulfite (SMBS) and citric acid-based composition that enables efficient and fast $SO_2$ release to suppress fungal growth in harvested fruits, vegetables, and other fresh plant products, and other susceptible commodities, delivery mechanisms for the composition, and related methods.

BACKGROUND OF THE INVENTION

Gray mold (*Botrytis cinerea*) is the most destructive postharvest disease of table grapes, blueberries, and figs, and other fresh fruit primarily because it develops at temperatures as low as $-0.5°$ C. and can spread from berry to berry or fruit to fruit. *Botrytis* rot on grapes can be diagnosed by its characteristic "slip skin" that develops on the surface of infected berries. Areas infected with gray mold on the berry skin turn brown and slip freely when rubbed, leaving the firm, underlying flesh exposed. Later, white, thread-like hyphal filaments erupt through the berry surface and finally, masses of gray-colored conidia develop. Uncontrolled infections spawn aerial mycelium that spreads adjacently in berries ("nests"). Prompt cooling and pre-storage fumigation with sulfur dioxide ($SO_2$) may be used to control gray mold.

However, treatments with excessive levels of $SO_2$ can damage table grapes by bleaching, causing sunken areas or hairline cracks on the berry surface, contributing to premature browning of the stems, and/or dryness of the rachis and pedicels attached to individual berries.

Also, the use of $SO_2$ sulfur dioxide gas is not permitted on certified organic grapes and there are no effective postharvest disease control treatment options for the organic grapes. Depending on the season, cultivar, and/or storage conditions, losses due to gray mold disease (*Botrytis cinerea*) can reach high percentages (0-50%) of natural *botrytis* infection. Because of consumers' demand for organic grapes, several alternatives to $SO_2$ have been investigated without success.

$SO_2$ fumigation causes a number of problems: some people are highly allergic to sulfite residues that form after fumigation, $SO_2$ can cause worker respiratory issues, $SO_2$ can damage equipment, and $SO_2$ is an air pollutant. Environmental regulations on $SO_2$ have become stricter in California to address these issues. Some regulatory agencies restrict discharge of $SO_2$ into the air near urban areas. At the same time, workers must not be exposed to gas concentrations above 2 ppm during sulfur dioxide application. Thus, careful attention to $SO_2$ treatment procedures is necessary to minimize exposure of workers and damage to fruit. Sulfite residue on fruit at the point of consumption is also a concern. Current $SO_2$ application techniques can cause excessive sulfite residue on the treated fruit. Sulfite residues in, e.g., grapes are currently limited to <10 ppm by the United States Environmental Protection Agency.

Therefore, there exists a need for improved methods of preventing fungal damage to table grapes, other fruit, vegetables and other crops at both field, postharvest storage and through supply transportation for both domestic retail and foodservice outlets and global export markets.

SUMMARY OF THE INVENTION

The present invention relates to a method and composition for enhancing the release of sulfur dioxide ($SO_2$) gas in postharvest fresh fruit packaging to improve decay control, protect fruit quality, and extend retail shelf life. Specifically, the invention involves the use of a dry mixture containing sodium metabisulfite ($Na_2S_2O_5$, "SMBS") and citric acid ($C_6H_8O_7$) as a catalyzer which accelerates the release total yield of $SO_2$ gas in the presence of moisture in a significantly reduced amount of time. The presently disclosed composition can be deployed in harvest storage boxes, shipping boxes, marine shipping container, and other storage and shipping containers for fresh fruit, vegetables, and other fresh plant products.

Sodium metabisulfite has been widely used as a source of $SO_2$ gas to prevent decay in fresh fruit, particularly table grapes, by inhibiting spore germination and penetration, and fungal growth. However, conventional $SO_2$ generation methods often involve fumigation or slow-release pads, which may have limitations in gas yield efficiency, leave high residue on and/or damage fruit and environmental concerns related to worker exposure and residue accumulation. The present invention addresses these issues by incorporating citric acid into a dry formulation, which enhances the rate and efficiency of $SO_2$ release when exposed to moisture.

The reaction mechanism of sodium metabisulfite in the presence of water leads to the formation of bisulfite ions ($NaHSO_3$), which subsequently decompose into sulfur dioxide gas. The inclusion of citric acid in this reaction further facilitates the fast and efficient release of $SO_2$ by increasing the conversion efficiency of metabisulfite ions in an aqueous environment:

Citric acid $HOC(CO_2H)$ $(CH_2CO_2H)_2$ may be added to the foregoing reaction mixture to increase the yield of sulfur dioxide gas in the metabisulfite and citric acid reaction in an aqueous solution.

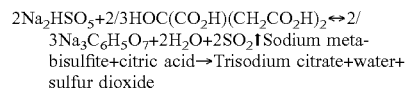

The combination of SMBS and citric acid may be made through a mixture of SMBS and citric acid powders or granules. To promote the chemical reaction between SMBS and citric acid in the presence of moisture and to optimize their combination for gradual and sustained $SO_2$ release, different deployment systems may be utilized. The mixture of SMBS and citric acid may be applied immediately or shortly after harvest within harvesting or storage boxes to control fungal growth atthe earliest possible time. Early deployment generally results in the preservation of the greatest proportion of the fruit or other plant product. However, the mixture of SMBS and citric acid can be effectively used at later stages. The catalyzation of $SO_2$ production by citric acid results in rapid release and contact of $SO_2$ gas with the fruit in the container. The rapid release can arrest and kill off any fungal growth that may have initiated in a delay between harvesting fruit or other plant products and the deployment of the mixture of SMBS and citric acid.

Microencapsulation may be used as a method for controlled $SO_2$ release. In this process, SMBS and citric acid are encapsulated together within food-grade polymer coatings, such as hydroxypropyl methylcellulose, alginate, or starch-based materials. These microcapsules regulate moisture exposure, ensuring that the reaction between SMBS and citric acid does not occur prematurely. Once the humidity inside a fruit container increases, the polymer coating begins to dissolve, gradually releasing $SO_2$ gas through the controlled breakdown of SMBS catalyzed by citric acid. This method offers several advantages, including gradual and sustained $SO_2$ emission, which helps maintain consistent fungal protection over an extended period. Additionally, microencapsulation prevents premature activation due to ambient moisture fluctuations, reducing the likelihood of excessive $SO_2$ bursts that could damage fruit. This technique minimizes direct chemical contact between the SMBS-citric acid mixture and the fruit, significantly lowering the risk of sulfite residue accumulation.

In other implementations, tablets or pellets may be used delivery systems, e.g., canister dispensers. SMBS and citric acid may be compressed a tablet press or other device into a tablet comprising the combination of SMBS and citric acid. A hydrophilic polymer coating, such as carboxymethyl cellulose, may be applied to regulate moisture penetration, preventing premature activation. When the tablet comes into contact with moisture, the outer coating may dissolve, and the moisture then penetrates the combination of SMBS and citric acid resulting in the efficient production of $SO_2$ gas. Additionally, these tablets have enhanced shelf stability, remaining inactive until exposed to moisture, which extends their usability in pre-packaged dispensers or liners. Their compact and structured form also makes them easy to handle, transport, and integrate into $SO_2$-emitting canisters or packaging systems, providing a reliable and efficient approach for fruit preservation during long-distance shipping.

In other embodiments, the SMBS-citric acid composition may be incorporated into a gel-based or coated film technology that can be used in box liner labels and moisture-regulated dual-layer systems. In this process, SMBS and citric acid are embedded within a gel matrix composed of hydrogel or alginate-based films. These films are then laminated onto liners or pads, ensuring a gradual and controlled $SO_2$ diffusion over time. The gel matrix is designed to absorb moisture progressively, preventing sudden activation and avoiding rapid $SO_2$ bursts that could lead to excessive exposure. Gel-based films can be seamlessly integrated into thin liner materials without adding significant bulk, making them an efficient and space-saving solution. Moreover, this controlled-release system prevents excessive $SO_2$ exposure, reducing the risk of bleaching or chemical damage to the fruit, thereby maintaining their quality and market appeal during shipping.

In further embodiments, buffered granules provide a further solution for $SO_2$ release in harvest, storage, and shipping containers. In this delivery form, SMBS and citric acid are granulated either separately or in combination and may be coated with silica or calcium carbonate to prevent premature activation due to ambient moisture. The granules may be stored inside a dispenser canister. Buffered granules may provide a steady diffusion that maintains a controlled gas concentration within a shipping container. The delayed activation and extended duration provided by the buffered granules are beneficial for long-term $SO_2$ regulation in controlled storage environments, reducing the need for frequent replacements. The controlled $SO_2$ release avoids sulfite accumulation, micro injuries to the fruit, bleaching of the fruit, and minimizes excess acid exposure; protecting packaging materials and container interiors from potential corrosive damage.

In further embodiments, the mixture of SMBS and citric acid may be integrated into a spray form with a carrier (e.g., paraffin wax, carnauba wax, lecithin, hydroxypropyl methylcellulose [HP MC], chitosan-based coatings, alginate hydrogels, and other appropriate carriers). In some implementations, paraffin wax serves as a protective carrier, encapsulating the reactive components and regulating their exposure to moisture, which prevents premature $SO_2$ release and enhances long-term preservation. The SMBS and citric acid ingredients may be milled into micro-sized particles to improve dispersion within the paraffin matrix. SMBS and citric acid are then kept in separate oil-based suspensions to prevent an early reaction. A small amount of emulsifier or dispersing agent, such as lecithin or a non-ionic surfactant, may be added to stabilize the suspension and ensure uniform distribution. The paraffin wax is then melted at a controlled temperature (typically 50-70° C., depending on the wax grade), creating a uniform liquid phase. Once the wax reaches the optimal temperature, the SMBS and citric acid dispersions are introduced slowly, ensuring even incorporation, in a ratio in a range of about 1:1 to 3:2. In some implementations, a microencapsulation or phase-separation technique may be applied, forming tiny dispersed droplets of the reactive compounds within the paraffin matrix. After the active ingredients are fully integrated, the paraffin-SMBS-citric acid mixture may be emulsified in a non-aqueous carrier solution, such as mineral oil or ethanol, to adjust viscosity for spraying. The final formulation may then be cooled and homogenized to maintain a stable dispersion suitable for aerosol or fine mist applications.

Once prepared, the SMBS-citric acid paraffin spray can be deployed in shipping environments using various methods. One approach is direct spraying onto box liners or $SO_2$-emitting pads, where the coating provides a thin, controlled-release layer that gradually degrades upon exposure to humidity, releasing $SO_2$ gas over time. Alternatively, the spray can be applied to the interior surfaces of shipping containers or the fruit or other plant products themselves.

Another option is encapsulate into microbeads, where the formulation is sprayed as microdroplets, solidifying into small beads inside the container or on another surface such as a sticker or label surface. The beads may gradually degrade in response to humidity, ensuring sustained $SO_2$ release over an extended period.

The wax-based formulation provides strong surface adhesion, allowing it to coat liners, walls, pads, stickers, labels, and other surfaces evenly without leaving excessive residue. The paraffin carrier may further enhance shelf stability, shielding the active ingredients and preventing degradation before activation.

Delivery Mechanisms
Sheets or Pads

In some embodiments, the combination of the citric acid and SMBS may be deployed in a sheet or pad infused with the combination. The sheets or pads may include a chemically active layer that includes the combination of SMBS and citric acid, which may be encapsulated in a composite material consisting of plastic and paper. A plastic layer helps contain the SMBS and citric acid, while the paper layer allows moisture absorption triggering the chemical reaction between SMBS and citric acid to release $SO_2$. The chemically active layer may include about 10% to about 30% sodium metabisulfite by weight and about 8% to about 24% citric acid by weight. The sheets or pads may be designed to release a controlled amount of $SO_2$ to match the requirements of grape storage, with the specific formulation of the pad determining how quickly and for how long the $SO_2$ would be released.

In use, a sheet or pad may be placed in a fruit shipping containers, such as a shipping box with micro-perforated liners inside to ensure a small percentage of the ventilation. Fruit containers, such as clamshells, cartons, mesh bags, or other packaging, containing harvested fruit, such as grapes, strawberries, cherries, figs etc. The sheets or pads may be placed in the shipping containers in proximity to the fruit, but not in direct contact with the fruit. In some examples, the sheets or pads may be positioned in the perimeter of the shipping container. In other examples, the sheets or pads may be individually placed in the fruit containers, e.g., clam shells. The sheets or pads are preferably positioned in upper portion (at or near the upper wall of the shipping container and/or the fruit containers. This positioning may result in the fruit being more thoroughly exposed to the $SO_2$ gas, as $SO_2$ is denser than air and will flow downward in the shipping container. There also should be some gap between the pad or sheet and the fruit to avoid direct bleaching or sulfite-related damage caused by high concentrations of the gas.

In one embodiment, a multilayer laminated sheet may be used to deliver SMBS and citric acid composition. The sheet may include a first and a second sheet composed of gas-permeable, moisture-transmissible material such as polyester, polypropylene, or polyethylene. Laminated between these two sheets may be a layer of wax-based or adhesive laminating substance in which a dry mixture of sodium metabisulfite (SMBS) and citric acid is dispersed.

The SMBS and citric acid are present in a predetermined weight ratio, such as approximately 5:4 to 2:1. For example, the composition may include about 10 wt % to about 30 wt % SMBS and about 8 wt % to about 24 wt % citric acid, embedded uniformly within a paraffin or microcrystalline wax matrix that serves as the laminating substance. This laminated structure facilitates controlled release of $SO_2$ gas upon absorption of ambient moisture, as encountered in high-humidity storage or shipping containers for fresh fruit.

The laminated sheet may be cut into rectangular sheets and inserted in fruit shipping cartons such that the moisture emitted by the fruit permeates the synthetic sheet material and initiates the $SO_2$-generating reaction. The rate of gas emission may be modulated by adjusting sheet thickness and the SMBS/citric acid ratio.

To facilitate a higher initial release rate, one of the laminate sheets may be patterned with apertures or sized smaller than the other to expose a portion of the active laminating layer directly to the internal carton atmosphere. In some embodiments, the laminating substance may contain microencapsulated SMBS and citric acid particles to provide a sustained release profile and prevent premature activation during handling or storage in ambient conditions.

Optionally, a humectant such as glycerol or a hygroscopic salt such as calcium chloride may be incorporated into the laminating matrix to enhance moisture uptake, thereby improving activation efficiency in relatively low-humidity environments.

The $SO_2$ release in the shipping boxes, storage facilities, freight or marine shipping containers is moisture dependent. Most fresh produce is held at above 90% humidity, which insure catalyzation of compounds under nearly all conditions. When the fruit is packaged and stored, the moisture inside the shipping box (from the fruit and the environment) is absorbed by the sheets or pads. As the moisture reacted with the SMBS and citric acid in the sheets or pads, sulfur dioxide gas is emitted according to the chemical formula provided above.

Box Liner Labels

In some embodiments, the SMBS and citric acid may be deployed through box liner labels impregnated with the mixture to control fungal growth with controlled $SO_2$ release. Box liner labels can take the form of either adhesive-backed sheets or non-adhesive liners placed inside shipping boxes. These labels can be impregnated with a mixture of SMBS and citric acid through coated film technology, where the liner label is made from plastic or paper-based material coated with a thin layer of SMBS and citric acid. The coating gradually emits $SO_2$ over time as it interacts with ambient moisture inside the carton.

In other implementations, the SMBS and citric acid mixture may be applied to the box liner label within a paraffin or microcrystalline wax matrix. In some embodiments, the laminating substance may contain microencapsulated SMBS and citric acid particles, in which microscopic polymer shells embedded in the label material contain SMBS. These capsules slowly break down when exposed to humidity, ensuring a controlled and sustained $SO_2$ release.

In further implementations, the SMBS and citric acid mixture may be applied to the box liner label through absorbent fiber integration, where the liner is made from cellulose or non-woven fibers infused with SMBS and citric acid powder. As moisture levels rise inside the carton, the fibers activate the chemical reaction between SMBS and citric acid, leading to a gradual and steady emission of $SO_2$ gas.

In still further implementations, the SMBS and citric acid mixture may be applied in dual-layer strips to the labels, which include two layers-one containing the SMBS and citric acid mixture (active layer) and another acting as a moisture regulator to control gas diffusion (moisture regulating layer). This design may provide consistent and prolonged $SO_2$ gas release, offering extended protection for the fruit. The active layer including the SMBS and citric acid mixture may be made from cellulose-based fibers or plastic laminates infused with pre-determined amounts of SMBS and citric acid. For example, the active layer may include SMBS in a range of about 1.5 mg/cm$^2$ to about 15 mg/cm$^2$ and citric acid in a range of about 1.2 mg/cm$^2$ to about 12 mg/cm$^2$. The controlled structure of this layer provides a steady emission of $SO_2$ to prevent fungal growth without exceeding safe exposure limits for the fruit.

The outer layer of the dual-layer $SO_2$-releasing strip, the moisture regulating layer, acts as a barrier and buffer between the external environment and the inner SMBS/citric acid-layer. The moisture regulating layer may be composed of hydrophilic and semi-permeable materials, which allow for controlled moisture diffusion while preventing direct exposure to excessive humidity, providing a gradual and steady release of $SO_2$ gas. The moisture regulating barrier may be made from microporous polymer films, coated paper, or non-woven fabric. The moisture regulating layer may moderate the amount of water vapor that reaches the SMBS/citric acid layer in part by the inclusion of specific pore sizes in the layer, allowing for slow and consistent diffusion of moisture rather than rapid absorption, which could lead to an uncontrolled release of $SO_2$. The pore size in the moisture regulating layer may be in a range of about 1 μm to about 5 μm.

Sachets or Tea Bags

SMBS and citric acid may be incorporated into a sachet as a delivery mechanism in a postharvest storage or container system. Sachets (e.g., sachet 100 in FIG. 1) are typically made from semi-permeable, moisture-absorbing materials (e.g., sachet bag 101 in FIG. 1) such as non-woven fabric, cellulose-based paper, or perforated plastic. The material must be breathable enough to allow controlled diffusion but sturdy enough to prevent SMBS and citric acid powders from leaking therefrom. Each sachet contains a measured amount of SMBS and citric acid, e.g., between about 0.1 g to about 5 g of SMBS and about 0.1 g to about 4 g citric acid. A single sachet may be used per 5-10 (e.g., 8) kilogram of fruit. The sachet may include other optional additives such as silica gel to regulate humidity and prevent excessive $SO_2$ bursts.

The sachets are designed in various sizes, with small sachets placed in individual fruit and or vegetable packaging, medium-sized sachets used in shipping pallets, and larger sachets deployed in a shipping container, but outside of the fruit containers. A small sachet, which may be used for individual fruit and or vegetable containers typically contains 0.1 g to 5 g of SMBS and about 0.1 to about 4 g citric acid. The volume of a small sachet may be in a range from about 1 cm$^2$ to about 4 cm$^2$. The sachet is generally compact, measuring approximately 3 cm by 3 cm, with a thickness varying between about 0.5 cm and 1 cm to allow for efficient placement within the packaging while ensuring controlled sulfur dioxide release. In individual fruit containers, small sachets may be placed above the fruit, e.g., under perforated liners, allowing a gradual release of $SO_2$ without causing bleaching or sulfite burns.

A medium-sized sachet may be used in harvesting, storage, or shipping boxes, and palletized shipments typically contains 5 g to 10 g of SMBS and about 4 g to about 8 g citric acid. The volume of the medium sachet may be in a range of about 4 cm$^2$ to 8 cm$^2$. In some examples, the sachet dimensions may be approximately 5 cm by 5 cm, with a thickness of about 1 cm. Medium-sized sachets (5-10 grams) may be inserted between layers of fruit containers in a shipping box to create even gas distribution while keeping $SO_2$ concentrations within safe limits.

A large sachet may be used in shipping containers typically and may contain about 50 g to about 100 g of SMBS and about 40 g to about 80 g citric acid. The large sachet volume may range between about 15 cm$^2$ and about 40 cm$^2$. A large sachet measures approximately 8 cm by 8 cm, with a thickness in a range of from about 1.5 cm to about 2 cm to ensure an adequate surface area for controlled sulfur dioxide release. In the shipping container itself, larger sachets may be positioned to release $SO_2$ gas throughout the storage environment (e.g., a marine shipping container). These sachets can be hung from the upper surface of the container, placed in air circulation ducts to ensure even gas distribution, or attached to the inner walls to keep them away from direct contact with the fruit containers.

Since $SO_2$ release is moisture-dependent, sachets absorb ambient moisture inside the carton, triggering the release of $SO_2$ gas. In a well-regulated shipping container, the ideal $SO_2$ concentration is no more than 2 ppm, ensuring effective mold prevention without causing excessive exposure that could result in bleaching, off-flavors, or allergic or other harmful reactions. Maintaining lower temperatures in shipping containers slows down $SO_2$ release, providing extended protection throughout the journey.

Canister Dispensers

SMBS and citric acid may be incorporated into a cannister dispenser as a delivery mechanism in harvesting containers, storage containers, shipping containers (e.g., marine shipping containers), storage rooms, or other container systems. A small canister dispenser is a rigid, vented container designed to house granulated or powdered sodium metabisulfite and citric acid while allowing for controlled moisture absorption and gas release. These canisters may be made from plastic, aluminum, or stainless steel and feature a semi-permeable membrane or adjustable vents to regulate the amount of $SO_2$ emitted therefrom.

The canisters may include about 10 g to about 50 g of SMBS and about 8 g to about 40 g citric acid. The canister dispensers may be positioned within the shipping container to create an even dispersion of $SO_2$ while preventing overexposure that could damage the fruit. The canisters can be attached to the inner walls or lids of the harvesting, storage, or shipping containers, ensuring localized $SO_2$ diffusion without direct contact with the fruit. This is especially useful for fruit stored in clamshells, where ventilation may be limited.

Internally, the canister may contain a moisture-wicking layer to draw in moisture from the surrounding air, triggering a gradual release of $SO_2$ from the SMBS and citric acid mixture. In some embodiments, a dual-compartment system may be used in the dispenser canisters, where one chamber holds the SMBS and citric acid mixture, and the other absorbs excess moisture, preventing sudden bursts of $SO_2$. In some embodiments, the canister may include a hygroscopic membrane that carefully regulates humidity absorption, providing long-lasting and even distribution of $SO_2$ gas throughout the container. Dispenser canisters may provide a longer-lasting emission through gradual diffusion, ensuring continuous protection over an extended period. Additionally, canister dispensers may be reused, allowing them to be refilled or replaced. Another important advantage is the reduction of direct contact with the fruit, minimizing the potential for contamination or residue buildup on surfaces of the fruit.

Cluster Bags

Cluster bags are perforated plastic bags made from polyethylene (PE) or polypropylene (PP), which allow for adequate airflow while also serving as a protective barrier for individual grape clusters. The incorporation of SMBS and citric acid within these bags can be achieved through several methods. One approach is by impregnated film technology, where the plastic film itself is coated with a thin layer of SMBS and citric acid, providing a slow and consistent emission of $SO_2$ gas throughout storage and transit. The plastic film may be coated with SMBS in a range of about 1.5 mg/cm$^2$ to about 15 mg/cm$^2$ and citric acid in a range of about 1.2 mg/cm$^2$ to about 12 mg/cm$^2$. In other implementations, a sachet containing SMBS and citric acid embedded within the cluster bag. In this design, a small sachet (e.g., sachet 100) containing SMBS and citric acid granules or powder may be affixed to the inner wall of the bag, typically enclosed in a semi-permeable material (e.g., sachet material 101) that absorbs moisture and gradually releases $SO_2$.

In a further implementation, a dual-layered insert may be used in which the cluster bag is designed with an inner liner that contains a thin sheet infused with SMBS and citric acid. This method may provide a controlled and even distribution of $SO_2$ gas over time, providing dosage control while minimizing direct contact between the SMBS and the fruit.

Fruit Coating

Further embodiments, a mixture of sodium metabisulfite (SMBS) and citric acid may be included in a wax-based composition comprising for direct application to fruit or other plant products. The composition may utilize a food-grade shellac, carnauba wax, or paraffin emulsion fora postharvest coating. The SMBS and citric acid may be finely milled and uniformly dispersed within the wax matrix to prevent clumping and ensure even distribution. Upon application, the wax forms a thin, breathable coating on the fruit surface, allowing controlled release of sulfur dioxide ($SO_2$) when exposed to ambient humidity. The coating may provide dual-action protection: a physical barrier against moisture loss and microbial entry, and a chemical barrier via $SO_2$ release to suppress fungal growth and other decay organisms, thereby extending shelf life during cold storage and transit.

Fruit Applications

The combination of SMBS and citric acid offers a highly effective sulfur dioxide ($SO_2$) release system for preserving various fruits and plant products during storage and shipping. Any of the deployment technologies applied in the field, old storage or marine container shipment delivery systems disclosed herein can be used in in-field packing, cold storage, freight or marine containers in transit and utilized for a wide variety of fruit, vegetables, and fresh plant products. However, different fruits and flowers may have varying sensitivities to $SO_2$, which may benefit from tailored application methods to prevent fungal growth while avoiding issues such as fruit bleaching, off-flavors, or visual tissue damage.

For grapes and soft-skinned berries such as blueberries, raspberries, blackberries, and currants, which are highly susceptible to *Botrytis cinerea* (gray mold), $SO_2$-emitting pads, sachets, or dual-layer strips placed within grape cartons or shipping containers (plastic, Styrofoam, cardboard . . . ), canisters, coatings are effective approaches to preserve the fruit. The controlled $SO_2$ release prevents fungal development while maintaining fruit quality. Blueberries, which have delicate skins and a moderate need for fungal protection, benefit from modified atmosphere packaging (MAP) with slow-release $SO_2$ liners or coated films, which prevent dehydration while providing gradual antifungal protection. For strawberries, which are highly perishable and sensitive to $SO_2$, a hydrogel-coated $SO_2$-emitting film or sachets microencapsulated granules or powder that release low, gradual $SO_2$ levels may be used to avoid affecting flavor and appearance.

Kiwi, which has moderate fungal susceptibility but is sensitive to high $SO_2$ concentrations, may be protected using buffered $SO_2$-releasing pads placed within cartons or container-mounted dispensers that release $SO_2$ evenly without exceeding safe exposure levels. For stone fruits such as peaches, plums, cherries, nectarines, and apricots, which are prone to postharvest decay but are highly sensitive to direct $SO_2$ exposure, $SO_2$-releasing coatings or gel-based sprays may be utilized. Hydrogel-coated $SO_2$ films or fine mist paraffin-SMBS sprays provide fungal control while avoiding direct contact, which could cause skin damage. Similarly, apples and pears, which have low fungal susceptibility but are prone to surface mold, may benefit from sachets or wax-based $SO_2$-releasing sprays that ensure controlled $SO_2$ diffusion without causing bleaching or textural changes.

Tomatoes, which are moderately susceptible to fungal decay but highly sensitive to $SO_2$, require low-dose $SO_2$ dispensers or film-integrated $SO_2$ release systems. Low-dose $SO_2$ strips or buffered dispensers inside packaging may provide safe protection without affecting tomato texture, flavor, or color.

For other plant products, such as flowers, which are highly susceptible to fungal infections like *Botrytis*, but can suffer petal discoloration from direct $SO_2$ exposure, humidity-sensitive $SO_2$ dispensers or granule-based slow-release canisters may provide fungal protection while keeping flowers fresh and vibrant during transport.

By tailoring the $SO_2$-release system to the specific needs of each fruit or plant, the SMBS-citric acid composition deployed in particular manner can effectively prevent fungal infections, extends shelf life, and maintains product quality without causing damage. While grapes, currants, and blueberries benefit from direct$SO_2$-emitting sachets, more sensitive fruits like strawberries, stone fruit, and tomatoes require coated films or dispensers to limit $SO_2$ exposure. Selecting a particular delivery method may provide optimal fungal protection and postharvest quality.

The timing of the initial $SO_2$ fumigation is can affect the success of fungal control. $SO_2$ fumigation immediately after picking provides the best fungal control results. Fast initial fumigation controls spore germination and penetration in the fruit, and thus reduces initial surface infection. $SO_2$ application at the field immediately after picking, when fruit clusters have been trimmed and field packed in shipper's box and sealed in by an external plastic liner. However, it is to be understood that the SMBC and citric acid composition can be adapted to other postharvest processes and at different times in the packing and shipping process.

The SMBS-citric acid composition, deployment technologies, delivery systems, and related methods provide enhanced accelerated and slow $SO_2$ release, improving the efficacy of decay control while potentially reducing the overall amount of sodium metabisulfite required. By utilizing a controlled-release delivery system, the invention allows for in-field application during packing for quick fungal suppression, immediately reducing the delay time of 6-8 hours between picking, transporting and eventual large-scale fumigation processes and reducing environmental and occupational exposure risks. The combination of SMBS and citric acid in a mixture offers several advantages, including:

a. More efficient (less SMBS amounts), and accelerated sulfur dioxide gas production and controlled release, leading to improved disease control and protection against all green tissue browning of peduncle, rachis, pedicels and berries in the case of table grapes;
b. Reduction in the total amount of sulfur dioxide used without compromising efficacy;
c. Decreased potential for environmental pollution and worker exposure; and
d. Adaptability to existing delivery platforms, such as sachets, box liners, labels, stickers, or impregnated materials, canisters, fruit coatings for seamless integration into fresh fruit and vegetable field and packing house operations.

This novel approach provides a practical and efficient solution for improving postharvest disease and decay control while minimizing chemical residues and operational challenges associated with traditional $SO_2$ fumigation methods for both in-field packing and cold storage shipping.

It is an objective of the present invention to provide a composition including sodium metabisulfite (SMBS) and citric acid to provide a more efficient and accelerated sulfur dioxide gas production for *Botrytis* management and disease control It is an objective of the present invention to provide a controlled-release $SO_2$ system utilizing a sodium metabisulfite (SMBS) and citric acid combination for postharvest fruit and vegetable preservation.

It is an objective of the present invention to provide a moisture-activated $SO_2$-emitting formulation wherein SMBS and citric acid are encapsulated within a matrix to ensure gradual sulfur dioxide release in case of long-term storage or export shipments.

It is an objective of the present invention to provide dual-compounds $SO_2$ delivery system, wherein SMBS and citric acid are coated on a surface to provide controlled gas emission upon humidity exposure.

It is an objective of the present invention to provide an $SO_2$-emitting liner or pad incorporating SMBS-citric acid composition, ensuring both quick and extended $SO_2$ release for in-field, storage and shipping applications.

It is an objective of the present invention to provide a sprayable $SO_2$-releasing composition, wherein SMBS and citric acid in a carrier, enabling spray application to a surface, e.g., in a marine shipping container.

It is an objective of the present invention to provide a $SO_2$-emitting sachet (e.g., sachet 100) or insert with a moisture-permeable membrane, allowing for controlled $SO_2$ generation for shipping and storage applications.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 3 provides a graph of the accumulated sulfur dioxide emission during a laboratory test after applying 0.5 g sodium metabisulfite (SMBS)+0.4 g citric acid in a table grape container.

FIG. 4 provides a graph of the accumulated sulfur dioxide emission during a laboratory test applying 0.25 g SMBS+0.2 g citric acid in a table grape container.

FIG. 5 provides a graph of the accumulated sulfur dioxide emission during a laboratory test applying 0.125 g SMBS+ 0.10 g citric acid in a table grape container.

FIG. 6 provides a graph of the accumulated sulfur dioxide emission during a laboratory test applying 0.0625 g SMBS+ 0.05 g citric acid in a table grape container.

FIG. 7 provides photographs of packing boxes used for table grapes for field experiments only. They are not table grape boxes used for packing and shipping.

FIG. 8 presents a table of data on the natural decay incidence in 'Stella Bella' table grapes affected by different postharvest treatments, including 0.5 g SMBS+0.4 g citric acid, 1 g SMBS alone, and an untreated control.

FIG. 9 presents a table of data from field trials evaluating gray mold incidence across seven table grape cultivars, comparing 0.5 g SMBS+0.4 g citric acid to an untreated control.

DETAILED DESCRIPTION

References will now be made in detail to certain embodiments of the invention, and example compositions and applications of such embodiments. While the invention will be described in reference to these embodiments, it will be understood that they are not intended to limit the invention. On the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Example 1—Lab Tests

Figure 1:
FIG. 1 provides photographs of exemplary sachets according to an embodiment of the present invention, as used in the experimental examples.
Figure 1:
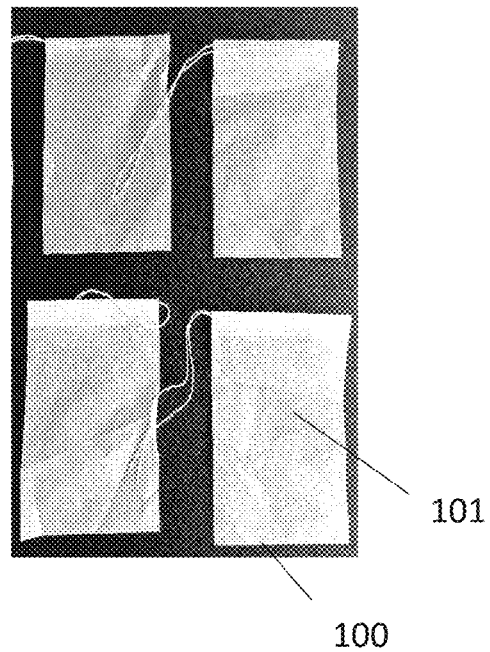

The lab studies aimed to evaluate the controlled release of sulfur dioxide ($SO_2$) from sodium metabisulfite (SMBS) combined with citric acid in sachet-based applications for postharvest grape storage. FIG. 1 shows the sachets used in the experiment, which were disposable NEPAK tea bags (sachet 100) having dimensions 3.15"×3.94"W×3.15"H. The primary goal was to determine how different doses of SMBS and citric acid affect $SO_2$ emission rates, with a focus on fungal suppression (*Botrytis cinerea*) and rachis preservation under high-humidity conditions.

Figure 2:
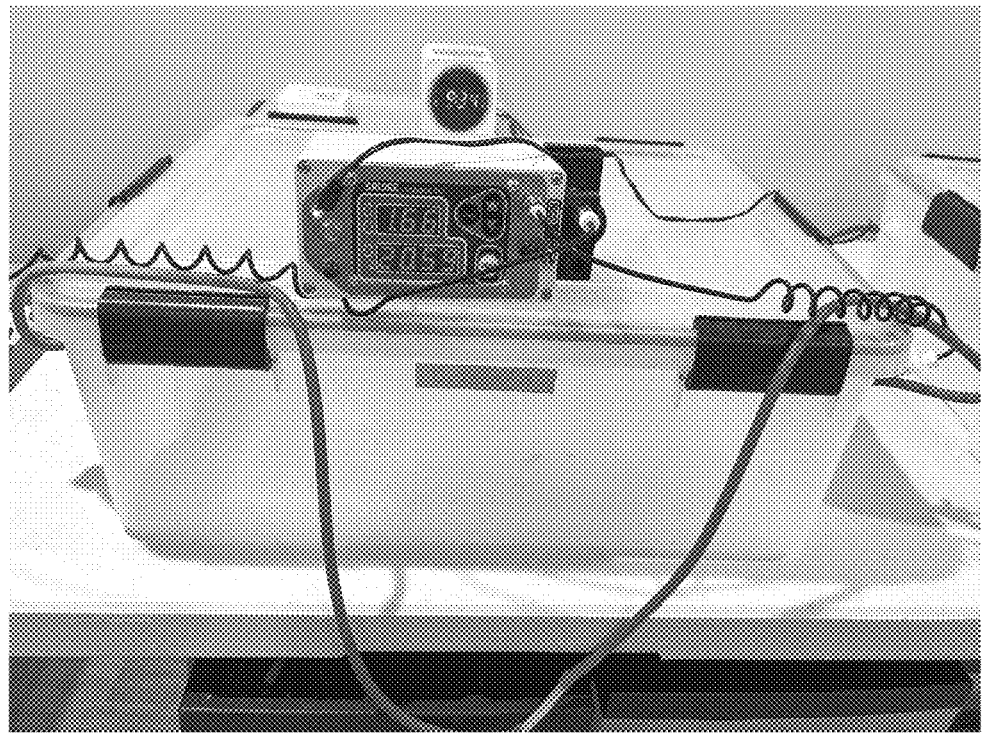
FIG. 2 provides an image of a sealed plastic container system, as used in the experiment or test examples.

The experiment was conducted in a controlled 20-liter volume sealed plastic box system, simulating commercial table grape storage conditions. The 20-liter box system is shown in FIG. 2. The sealed plastic containers were designed with a sampling inlet and outlet circuit using surgery tubing, from which air was running constantly throughout for $CO_2$ and $SO_2$ detection without depleting the gas composition inside the container. $SO_2$ concentrations were measured using a Porta Sens III gas analyzer, while $CO_2$ levels were assessed with a Horiba VIA-510 infrared gas analyzer. Sachets containing varying doses of SMBS and citric acid were placed inside the sealed system, and gas emission data were collected over time.

The $SO_2$ release profiles for different SMBS-citric acid dosages were analyzed over the first hour following application, with each treatment replicated three times to ensure statistical accuracy and reproducibility. The results demonstrated a clear dose-dependent emission pattern, where higher SMBS-citric acid concentrations produced greater and more immediate $SO_2$ release, while lower doses resulted in a slower, more sustained release.

As shown in FIG. 3, the highest $SO_2$ release was observed in the 0.50 g SMBS+0.40 g citric acid treatment, which exhibited a rapid peak concentration within 20 minutes of exposure, followed by gradual stabilization. This formulation is expected to be most effective for rapid fungal suppression, particularly in high-humidity storage conditions.

As shown in FIG. 4, the sachets containing 0.250 g SMBS+0.200 g citric acid treatment showed a moderate but sustained $SO_2$ release, with a slower buildup compared to the highest dose but still reaching levels sufficient for mold prevention. This dosage may be better suited for medium-term storage applications where a gradual emission is preferable.

As shown in FIG. 5, the 0.125 g SMBS+0.10 g citric acid treatment exhibited a lower $SO_2$ emission profile, characterized by delayed release and a reduced peak concentration. While this formulation may be less effective for immediate fungal suppression, it could be advantageous for long-term storage scenarios where sustained exposure to $SO_2$ is needed.

As shown in FIG. 6, the lowest tested dose, 0.0625 g SMBS+0.05 g citric acid, produced the least cumulative $SO_2$ emission and may be insufficient for effective fungal control. However, it could be beneficial for sensitive fruits requiring ultra-low $SO_2$ exposure to avoid quality degradation.

The $SO_2$ release rate directly correlated with SMBS-citric acid dosage, demonstrating a dose-dependent emission pattern. Higher doses produced immediate and elevated $SO_2$ peaks, whereas lower doses provided a more gradual and extended release. These findings show that $SO_2$ concentration can be precisely adjusted based on storage duration, fruit sensitivity, and fungal suppression needs, allowing for customized postharvest protection strategies across different fruit storage and transport conditions.

Field Trials

Field experiments evaluating $SO_2$ emissions from sodium metabisulfite (SMBS) and citric acid sachets, were also conducted to evaluate the effectiveness of these formulations in commercial postharvest table grape storage. The field trials were conducted across two seasons, focusing on red, green, and black table grape cultivars. The primary objective was to determine the impact of SMBS with and without a citric acid catalyzer on gray mold (Botrytis cinerea) incidence and overall rachis condition during cold storage.

The field trials tested the application of sulfur dioxide ($SO_2$) from sodium metabisulfite (SMBS) combined with citric acid in sachet-based applications applied immediately after harvest, during standard field packaging in plastic grape boxes (13.0"×19.0"×5.0", or about 20 liters), as shown in FIG. 7. The boxes were then transferred to cold storage (32° F.) within 8 hours. Unlike conventional postharvest treatments that involve weekly sulfur dioxide fumigation, no additional $SO_2$ applications were made in the cold room, providing an uncontaminated $SO_2$ free environment to assess the efficacy of the sachet application. The experimental setup included four randomized replications per treatment, with sachets containing a pre-measured dry chemical combination of sodium metabisulfite (SMBS) and citric acid sealed in disposable tea bags (3.15"L×3.94"W×3.15"H), as shown in FIG. 1.

Example 2—Natural Decay in 'Stella Bella' Table Grape

Decay incidence was evaluated at four weeks of cold storage, based on visible mycelial growth or slip-skin symptoms, with results expressed as decay incidence by weight. Statistical significance was assessed using Tukey's test at a 5% probability level to determine treatment differences.

FIG. 8 presents the natural decay incidence in 'Stella Bella' grapes from the 2022 season, comparing SMBS alone (1 g), SMBS+citric acid (0.5 g+0.4 g), and an untreated control. The SMBS+citric acid treatment significantly reduced gray mold incidence (0.9%), equating to an 88% reduction relative to the untreated control (3.3%). The 1 g SMBS-only treatment showed a moderate reduction (2.4%), but was still significantly less effective than the SMBS+citric acid combination. These results indicate that citric acid plays a crucial role as a catalyzer, enhancing the efficacy of SMBS by promoting faster and sustained $SO_2$ release.

Regarding rachis condition, the SMBS+citric acid treatment received a score of 2-3, indicating moderate rachis preservation compared to 3-4 showing severe damage in the untreated and SMBS-only treatments. This suggests that $SO_2$ exposure from SMBS+citric acid may slow rachis desiccation, likely by reducing oxidative stress and fungal colonization.

Example 3—Gray Mold in Seven Table Grapes

FIG. 9 provides field trial data on gray mold incidence in seven different table grape cultivars from the 2023 season, comparing 0.5 g SMBS+0.4 g citric acid to an untreated control after four weeks of storage. Across all cultivars, the SMBS+citric acid treatment significantly reduced gray mold, with relative reductions ranging from 29% to 50%. The greatest effect was observed in 'Flame Seedless' (50% reduction), followed by 'Thompson Seedless' (39%) and 'Stella Bella' (34%). Even in cultivars with lower baseline gray mold incidence, such as 'Allison' and 'Red Globe', the treatment still resulted in a significant reduction (33%).

These findings reinforce the broad efficacy of SMBS+citric acid sachets across multiple grape varieties, suggesting that $SO_2$ release mechanisms are effective regardless of cultivar-specific susceptibility to Botrytis cinerea. The statistical significance of these reductions was confirmed by Tukey's test ($p<0.05$), indicating that the observed differences were not due to random variation.

The dose-response relationship observed across both seasons confirms that SMBS combined with citric acid is a superior postharvest treatment compared to SMBS alone. The catalyzing effect of citric acid enhances $SO_2$ production, leading to greater fungal suppression and improved rachis preservation. The consistent reductions in gray mold incidence across multiple grape cultivars demonstrate the broad-spectrum effectiveness of this approach in postharvest table grape management.

From a commercial perspective, these findings suggest that integrating SMBS+citric acid sachets or in other delivery mechanisms into standard packaging could provide a viable alternative to weekly $SO_2$ fumigation, particularly in organic cold storage systems where conventional fumigation is restricted. The treatment's proven efficacy in reducing gray mold makes it an attractive option for long-distance fruit shipments, ensuring fungal suppression and prolonged fruit quality during extended storage and transport. Additionally, the positive impact on rachis condition suggests that this formulation may enhance the visual appeal of fruit.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed:

1. A system for deploying a sulfur dioxide ($SO_2$)-generating composition in harvesting containers, storage containers, and shipping containers, comprising:
   a. a dry composition comprising sodium metabisulfite (SMBS) and citric acid configured to react upon exposure to moisture to release $SO_2$ gas; and
   b. a deployment mechanism that houses or incorporates the dry composition, wherein the deployment mechanism is configured for placement in a container for transporting fresh produce to control the release of $SO_2$ gas over time within the container.

2. The system of claim 1, wherein the deployment mechanism comprises a sachet containing a measured amount of the composition enclosed in a moisture-permeable material.

3. The system of claim 1, wherein the deployment mechanism comprises a microencapsulated formulation embedded within a moisture-sensitive coating selected from hydroxypropyl methylcellulose, alginate, or starch-based materials.

4. The system of claim 1, wherein the deployment mechanism comprises a tablet or pellet, wherein the SMBS and citric acid are compressed together and covered in a hydrophilic coating.

5. The system of claim 1, wherein the deployment mechanism includes a moisture-activated release barrier to prevent premature activation.

6. The system of claim 1, wherein said pre-determined ratio of SMBS and citric acid is in a range from about 1:1 to about 3:2 SMBS:citric acid.

7. The system of claim 1, wherein the SMBS is present in an amount ranging from about 10% to about 70% by weight of the composition and the citric acid is present in an amount ranging from about 8% to about 50% by weight of the composition.

8. A system for controlling mold and rot in postharvest produce, comprising:
   a. a container for housing harvested whole produce; and
   b. a sulfur dioxide ($SO_2$)-generating composition in a deployment mechanism having a moisture permeable outer surface in proximity to said harvested whole produce, wherein the composition comprises sodium metabisulfite (SMBS) and citric acid.

9. The system of claim 8, wherein the deployment mechanism is a sachet.

10. The system of claim 8, wherein the deployment mechanism is a sheet or pad, wherein said composition is applied to a surface of said sheet or pad.

11. A system for deploying a sulfur dioxide (SO2)-generating composition in harvesting containers, storage containers, and shipping containers, comprising: a. a composition comprising sodium metabisulfite (SMBS) and citric acid configured to react upon exposure to moisture to release $SO_2$ gas, wherein the composition comprises a ratio of SMBS to citric acid that is no higher than about 3:2; and b. a deployment mechanism that houses or incorporates the composition, wherein the deployment mechanism is configured to control the release of $SO_2$ gas over time within a container for holding whole fresh produce.

12. The system of claim 11, wherein the deployment mechanism comprises a sachet containing a measured amount of the composition enclosed in a moisture-permeable material.

13. The system of claim 11, wherein the deployment mechanism comprises a sheet or pad impregnated with the composition and enclosed within a composite material consisting of plastic and paper.

14. The system of claim 11, wherein the deployment mechanism comprises a microencapsulated formulation embedded within a moisture-sensitive coating selected from hydroxypropyl methylcellulose, alginate, or starch-based materials.

15. The system of claim 11, wherein the deployment mechanism comprises a tablet or pellet, wherein the SMBS and citric acid are compressed together and covered in a hydrophilic coating.

16. The system of claim 11, wherein the deployment mechanism is positioned in the upper portion of the container to facilitate downward dispersion of $SO_2$ gas.

* * * * *